United States Patent
Reynolds

(10) Patent No.: US 9,004,816 B2
(45) Date of Patent: Apr. 14, 2015

(54) IN SITU REMEDIATION OF SOILS AND GROUND WATER CONTAINING ORGANIC CONTAMINANTS

(71) Applicant: Geosyntec Consultants, Inc., Boca Raton, FL (US)

(72) Inventor: David A. Reynolds, Kingston (CA)

(73) Assignee: Geosyntec Consultants, Inc., Boca Raton, FL (US)

( * ) Notice: Subject to any disclaimer, the term of this patent is extended or adjusted under 35 U.S.C. 154(b) by 8 days.

(21) Appl. No.: 13/793,173

(22) Filed: Mar. 11, 2013

(65) Prior Publication Data

US 2014/0255099 A1    Sep. 11, 2014

(51) Int. Cl.
| | |
|---|---|
| *B09C 1/06* | (2006.01) |
| *B09C 1/00* | (2006.01) |
| *B09C 1/08* | (2006.01) |
| *C25B 11/00* | (2006.01) |

(52) U.S. Cl.
CPC .............. *B09C 1/062* (2013.01); *B09C 1/002* (2013.01); *B09C 1/08* (2013.01); *B09C 1/085* (2013.01); *B09C 2101/00* (2013.01); *C25B 11/00* (2013.01)

(58) Field of Classification Search
CPC .......... B09C 1/002; B09C 1/062; B09C 1/08; B09C 1/085; B09C 2101/00
USPC ............................................ 405/128.1–128.9
See application file for complete search history.

(56) References Cited

U.S. PATENT DOCUMENTS

| | | | |
|---|---|---|---|
| 5,114,497 A | 5/1992 | Johnson et al. | 134/21 |
| 5,398,756 A | 3/1995 | Brodsky et al. | 166/248 |
| 5,476,992 A | 12/1995 | Ho et al. | 588/204 |
| 5,656,239 A | 8/1997 | Stegemeier et al. | 422/32 |
| 5,975,799 A | 11/1999 | Carrigan et al. | 405/128 |
| 6,019,548 A | 2/2000 | Hoag et al. | 405/128 |
| 7,290,959 B2 | 11/2007 | Beyke et al. | 405/128.55 |
| 7,547,160 B2 | 6/2009 | Thomas et al. | 405/128.5 |
| 2007/0243022 A1* | 10/2007 | Pool | 405/128.1 |
| 2011/0268507 A1* | 11/2011 | Guo et al. | 405/128.7 |

OTHER PUBLICATIONS

Reynolds, D., et al., Electrokinetic Migration of Permanganate Through Low-Permeability Media, *Ground Water*, vol. 46, No. 4, Jul. 1, 2008, pp. 629-637, 9 pages.
Roach, N., et al. "Electrokinetic delivery of permanganate into low-permeability soils", *International Journal of Environment and Waste Management*, vol. 1, No. 1, Jan. 1, 2006, pp. 4-19, 16 pages.
International Searching Authority, International Search Report and Written Opinion, PCT/US2014/021033, date of mailing Aug. 29, 2014, 11 pages.

* cited by examiner

*Primary Examiner* — Benjamin Fiorello
(74) *Attorney, Agent, or Firm* — Sunstein Kann Murphy & Timbers LLP

(57) ABSTRACT

A method for remediating contaminated soil includes adding a heat-activated oxidizing agent into the soil; exposing the soil to direct current through a first set of electrodes so as to cause migration of the oxidizing agent through the soil and pore water contained in the soil; and exposing the soil to alternating current through a second set of electrodes so as to heat the soil and thus to activate the oxidizing agent. The first and second sets of electrodes are optionally the same set.

18 Claims, 3 Drawing Sheets

US 9,004,816 B2

IN SITU REMEDIATION OF SOILS AND GROUND WATER CONTAINING ORGANIC CONTAMINANTS

TECHNICAL FIELD

The present invention relates to the in situ decontamination of soils and groundwater using a combination of amendment addition and direct and alternating electric fields, and more particularly to the use of direct current electric fields to transport persulfate oxidant through saturated or partially saturated soils followed by the activation of the persulfate through heating the saturated or partially saturated soils and groundwater with the application of an alternating current electric field.

BACKGROUND ART

Destruction of organic contaminants, particularly volatile organic contaminants (VOCs) when they are located in low permeability soils is a complex problem with limited cost-effective alternatives to reduce their impacts on health and the environment. Current practices for remediation in low permeability soils focus on excavation and disposal in landfills, heating of the soils beyond the boiling point of water and then capturing the vapour for treatment or sequestration, or large-scale mixing of the soils with cements or other solidifying agents mixed with treatment compounds to degrade the VOCs. These current practices involve transplacement of the contaminants from one location to another, leave the contamination in place, or have very environmentally unfriendly carbon footprints.

The use of heat applied to the subsurface to volatilize contaminants and their subsequent capture via an applied vacuum is a commercially available technology. Heat is either delivered through thermal conductive heating (TCH), where vertical heater wells are heated to high temperatures and the heat is allowed to migrate through the soil, increasing the temperature of the soil as it conducts, or through electrical resistance heating (ERH) where an alternating current is applied to the soil via emplaced electrodes, and the resistance to the conduction of electricity results in heating of the soil. ERH is the subject of U.S. Pat. Nos. 7,290,459 and 5,656,239 and TCH is the subject of U.S. Pat. No. 5,114,497.

The use of oxidants, specifically persulfate, to degrade contaminants in soil and groundwater is a commercially available approach and is the subject of U.S. Pat. No. 6,019,548. Oxidation approaches are historically limited to soils where the oxidant can be effectively injected in a liquid mixture, limiting their use to permeable soils such as sands. For the particular oxidant persulfate, an additional activation step is required to produce the effective oxidizing radical. Activation processes include mixing with a metal ion, base activation where the pH of the system is raised well above natural groundwater levels, peroxide activation, or heating the mixture to temperatures above natural groundwater systems, but not to boiling temperatures, or some combination of the four.

Recent advances in the field of contaminant hydrogeology have shown that electrokinetics can be used to deliver remediation agents (through processes called electromigration or electroosmosis) such as oxidants, reductants, or electron donors to contaminants located in low permeability soils. This approach is commercially available and is the subject of U.S. Pat. No. 7,547,160. Historical use of electrokinetics in the remediation of soil and groundwater has focused on the use of electroosmosis to migrate contaminants to treatment zones, as opposed to the migration of treatment fluids to the contaminants. The use of electroosmosis in the remediation of soils and groundwater is commercially available and is the subject of numerous U.S. patents (U.S. Pat. Nos. 5,398,756; 5,476,992; 5,584,980; 5,725,752).

The combination of direct current electromigration and/or electroosmosis of persulfate oxidant in low permeability soils, and alternating current heating of the soils to provide activation of the persulfate oxidant by heat overcomes many of the limitations or environmental impacts of existing approaches. The advantage of the new process is that contaminants are treated in place with moderate application of external energy, and a much reduced carbon footprint than conventional heat-based approaches.

SUMMARY OF THE EMBODIMENTS

In a first embodiment of the invention there is provided a method for achieving oxidation of organic contaminants held in low permeability soil and its contained pore water. The method comprises the supply and electromigration and/or electroosmosis of an oxidant throughout the soil and pore water by means of an applied direct current via vertical rod-like electrodes arrayed in lines placed within the soil, followed by the heating of the soil and pore water, for example, to at least 30° C. by an applied alternating current using the identical electrodes. Optionally, a second set of electrodes may be used to conduct the heating of the soil and pore water. The oxidant is added to the system through supply wells located between electrodes as well as in the electrode wells themselves.

In a second embodiment, the soil is initially heated, for example, to at least 30° C., by an applied alternating current via vertical rod-like electrodes arrayed in lines placed within the soil, followed by the electromigration and/or electroosmosis of an oxidant throughout the soil and pore water by means of an applied direct current.

In certain embodiments, the electrodes used may be horizontal rather than vertical.

In certain embodiments, the electrodes may be a combination of vertical and horizontal.

In certain embodiments the electrodes may consist of conductive granular materials rather than rod-like materials.

In certain embodiments, the electrodes may be placed in grids or other non-linear configurations to achieve the desired migration and heating.

In additional embodiments, the oxidant may only be added at the electrodes or only at the supply wells.

In an additional embodiment, the oxidant is persulfate which may be supplemented with other oxidants (such as permanganate) to allow for degradation of the contaminants while the heating process is underway.

In another embodiment of the invention, there is provided a method for achieving oxidation of organic contaminants held in low permeability soil and its contained pore water. Electrodes are implanted in a low permeability soil with pore water. The oxidant is added to the system through supply wells located between electrodes as well as in the electrode wells themselves. The soil is exposed to direct current and alternation current to cause electromigration and/or electroosmosis of an oxidant throughout the soil and pore water and heating of the soil and pore water, for example, to at least 30° C.

In general terms, in each of the above described embodiments, it is desired to degrade contaminants resident within low permeability soils and their contained pore waters through electromigration and/or electroosmosis of an oxidant combined with ERH of the soil.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

The term "low permeability" means a soil permeability that would limit the injection of fluids without excessive pressures or fracturing of the soil.

The term "electromigration" in a soil means the migration of ionic species within the soil and the pore water that occurs under the force of an electric field.

The term "electroosmosis" means the motion of liquid induced by an applied electric field across a porous material.

The term "electrokinetics" means a family of several different effects (electromigration, electroosmosis, electrophoresis) that occur in porous bodies filled with fluid. There is a common source of all these effects—the so-called interfacial 'double layer' of charges. Influence of an external force on the diffuse layer generates tangential motion of a fluid with respect to an adjacent charged surface.

An "AC/DC power source" means an electrical device which is capable of supplying both direct and alternating currents to a system of electrodes.

A "set" means a group of at least one pair.

In general terms, in each of the above described embodiments, it is desired to degrade contaminants resident within low permeability soils and their contained pore waters through electromigration and/or electroosmosis of an oxidant combined with ERH of the soil.

Figure 1:
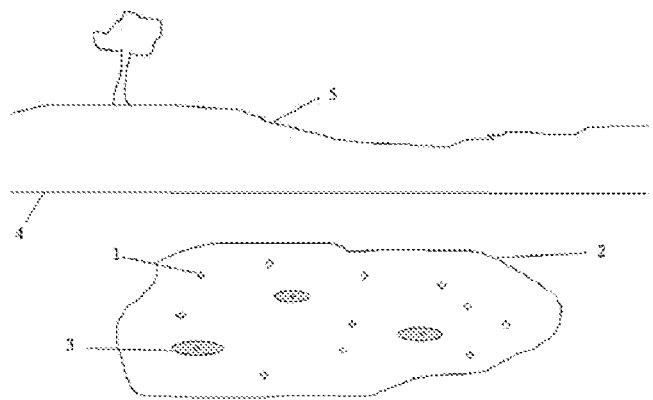
FIG. 1 is a schematic cross section view of a contaminated low permeability soil.
Figure 2:
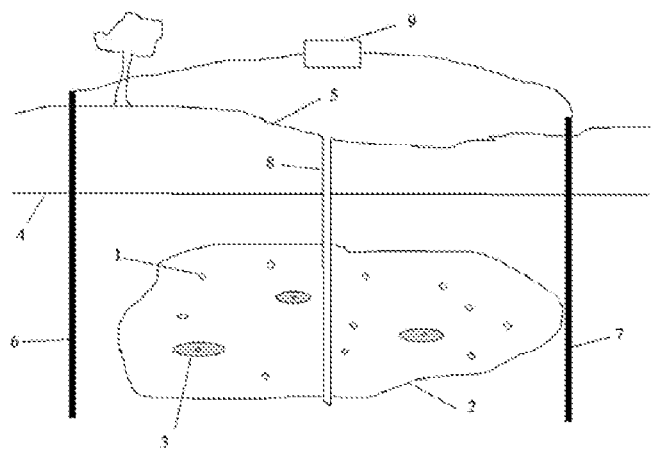
FIG. 2 is a schematic cross section view of electrodes and supply wells located to treat the contaminated soil.
Figure 3:
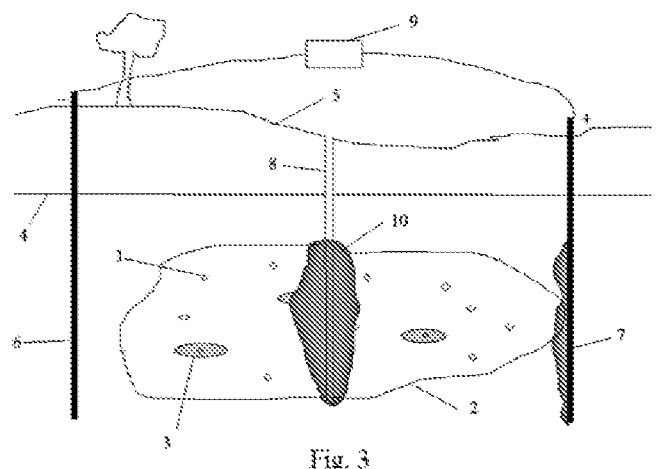
FIG. 3 is a schematic cross section view of the migration of the persulfate oxidant from the electrodes and supply wells through the low permeability soil.
Figure 4:
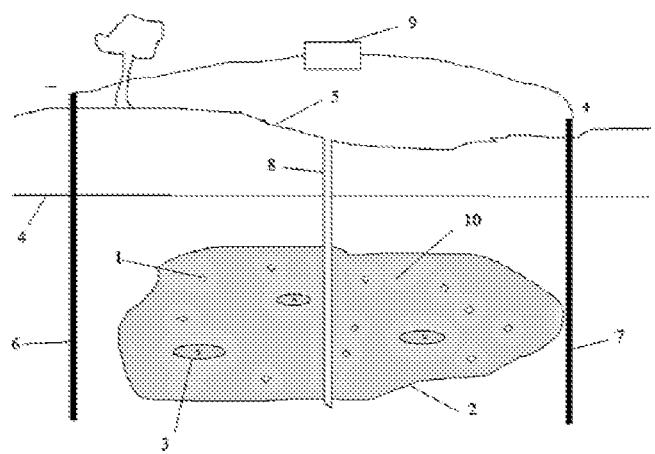
FIG. 4 is a schematic cross-section of the ERH system being activated after the persulfate oxidant has been migrated through the low permeability soil.

Referring to FIGS. 1 and 2, there is provided a method for achieving oxidation of organic contaminants 1 held in a low permeability soil 2 and its contained pore water 3. Once low permeability soil beneath the water table 4 below the surface 5 is located and sized through methods known in the art, a set of rod-like electrodes 6 and 7 are inserted into the ground. The electrodes are positioned in an array of lines to produce an electromagnetic field throughout the contaminated soil. Depending on the size and depth in which the contaminant is dispersed, the electrodes may be positioned so as to encompass either the entirety of the contaminated soil or, if the size is too large to be practical and effective, the treatment of the soil is performed in sections consisting of smaller soil volumes. Referring to FIGS. 2 and 3, one or more wells 8 are dug into the soil throughout the section between the electrodes, optionally including wells near the electrodes, for the supply of an oxidant. Treatment of the soil and pore water begins with the addition of the oxidant in the supply well and the application of a direct current with a power source 9 between positive and negative electrodes to distribute the oxidant throughout the soil and pore water. Referring to FIG. 4, once the oxidant is dispersed, it is activated by heating the soil and pore water to at least 30° C. by the application of alternating current using the identical set of electrodes or a new set of electrodes.

Alternatively, the soil is initially heated to at least 30° C. by applying the alternating current to the electrodes arrayed in lines placed within the soil, followed by the electromigration and/or electroosmosis of the oxidant throughout the soil and pore water by applying a direct current. The process may be repeated in over numerous sections of the total soil volume to be treated or multiple times on the same section or both.

Figure 5:
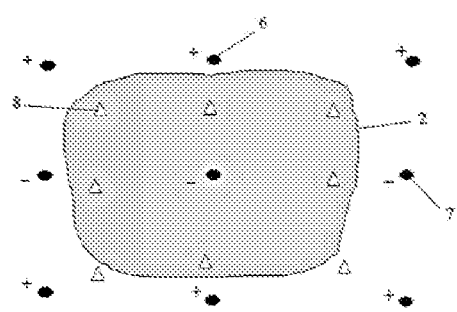
FIG. 5 is a schematic plan view of an alternate electrode and supply well configuration.

Alternatively, the electrodes used may be placed in a horizontal position rather than vertical. Also, the electrodes may be disposed in a combination of vertical and horizontal positions. Referring to FIG. 5, the electrodes may be placed in grids or other non-linear configurations to achieve the desired migration and heating.

The electrodes may also be made of conductive granular materials rather than rod-like materials.

The oxidant is preferably a compound that is capable of being activated or the performance of which is increased by heating to allow for degradation of the contaminants while the heating process is underway, for example a persulfate. Persulfate may be added alone or may be supplemented with other oxidants (such as permanganate).

Power sources used in the process are commercially available and are capable of supplying the required currents to the electrodes as single unit operating with switches from DC to AC current or as separate units, one DC and one AC. Optionally, analog or digital programmable modules may be coupled to the power source to set periods and cycles of exposure of the types of current to the electrodes.

EXAMPLE

A saturated subsurface low permeability layer consisting of silts and clays, approximately 15 feet below ground surface, 10 feet in thickness, and 100 feet in radius which is contaminated with dissolved chlorinated solvents (such as trichloroethylene—TCE) through releases to the subsurface from the surface is designated to be remediated. Electrode wells are installed in a pattern suitable for the remediation (suitable spacing between the wells ranges from 3 to 25 feet), consisting of Mixed Metal Oxide electrodes suspended inside 4" PVC well casings screened across the low permeability layer. Oxidant supply wells are installed between electrode wells, consisting of 4" PVC well casings screened across the low permeability layer. Monitoring infrastructure such as pH meters, water level meters, and voltage meters are installed inside the electrode and supply wells. An oxidant suitable for heat-activation (such as a persulfate salt) is supplied to the remediation system via the supply wells and the cathode electrode well through peristaltic pumps at a rate sufficient to maintain target concentrations of oxidant in the wells. The target concentration is based on the level of contamination and the natural oxidant demand of the system. A direct current (DC) is then applied across the electrodes to promote electromigration and electroosmosis of the oxidant from the cathode electrode wells and the supply wells. The direct current is applied via rack-mounted DC power supplies in the range of 0.5 to 5 A/m2 (or 1-2 V/cm) until a volume equivalent to the pore volume of the contaminated zone has been migrated from the electrode and supply wells into the contaminated zone. The power supply is then switched to an alternating current (AC) supply, operating on a 480 V supply for a period of 2 to 8 weeks until the soil and groundwater temperatures in the contaminated zone are greater than 60 degrees C. The oxidant migration stage is then repeated (to make use of the elevated temperature) by switching to a DC supply and migrating a pore volume of oxidant once again.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for the remediation of contaminated soil comprising:
    adding a heat-activated oxidizing agent into the soil, such soil including pore water;
    exposing the soil to direct current through a first set of electrodes so as to cause migration of the oxidizing agent through the soil and pore water; and
    exposing the soil to alternating current through a second set of electrodes so as to heat the soil and thus to activate the oxidizing agent.

2. The method of claim 1, wherein the oxidizing agent comprises persulfate.

3. The method of claim 1, wherein the oxidizing agent comprises a mixture of persulfate and one or more of permanganate, ozone, and hydrogen peroxide.

4. The method of claim 1, wherein exposing the soil to alternating current includes doing so until temperature of the soil has been raised to at least 30° C.

5. The method of claim 1, wherein adding the heat-activated oxidizing agent follows exposing the soil to alternating current, and precedes exposing the soil to direct current.

6. The method of claim 1, further comprising implanting the first and second sets of electrodes in a substantially vertical orientation into the soil.

7. The method of claim 1, further comprising implanting the the first and second sets of electrodes in a substantially horizontal orientation into the soil.

8. The method of claim 1, further comprising implanting a first group of the first and second sets of electrodes in a vertical orientation into the soil and a second group of them in a horizontal orientation into the soil.

9. The method of claim 1, wherein the electrodes are formed of rod-like conductive materials.

10. The method of claim 1, wherein the electrodes are formed of conductive granular materials.

11. The method of claim 1, further comprising implanting the sets of electrodes in a grid pattern.

12. The method of claim 1, further comprising implanting the first and second sets of electrodes into the soil and wherein adding the heat-activated oxidizing agent into the soil includes implanting the oxidizing agent at a location where one of the electrodes in the first set is implanted.

13. The method of claim 1, wherein adding the heat-activated oxidizing agent into the soil includes implanting the oxidizing agent in supply wells formed to receive the oxidizing agent.

14. The method of claim 1, wherein exposing the soil to direct and alternating current is applied to sections of the soil sequentially in order to treat the entire volume of contaminated soil.

15. The method of claim 1, wherein exposing the soil to direct and alternating current is performed for more than one cycle.

16. The method of claim 1, wherein the first set of electrodes, for exposing the soil to direct current, and the second set of electrodes, for exposing the soil to alternating current, are the same set.

17. The method of claim 1, wherein the first set of electrodes, for exposing the soil to direct current and the second set of electrodes, for exposing the soil to alternating current, are distinct sets.

18. A method for the remediation of contaminated soil comprising:
    implanting a set of electrodes into a contaminated soil of low permeability, such soil including pore water;
    adding a heat-activated oxidizing agent into the soil;
    exposing the soil to direct current through the set of electrodes so as to cause migration of the oxidizing agent through the soil and pore water; and
    exposing the soil to alternating current through the set of electrodes so as to heat the soil and thus to activate the oxidizing agent.

* * * * *